United States Patent
Do et al.

(10) Patent No.: US 8,843,544 B2
(45) Date of Patent: Sep. 23, 2014

(54) AGGREGATING INTERNET ADDRESSES IN A NETWORKED COMPUTING ENVIRONMENT

(75) Inventors: Lydia M. Do, Raleigh, NC (US); Rick A. Hamilton, II, Charlottesville, VA (US); Brian M. O'Connell, RTP, NC (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 13/473,667

(22) Filed: May 17, 2012

(65) Prior Publication Data

US 2013/0311535 A1 Nov. 21, 2013

(51) Int. Cl.
*G06F 15/16* (2006.01)

(52) U.S. Cl.
USPC .......................................................... 709/201

(58) Field of Classification Search
USPC .................. 709/201, 204–205, 217–218, 245
See application file for complete search history.

(56) References Cited

U.S. PATENT DOCUMENTS

| | | | |
|---|---|---|---|
| 6,192,407 B1 | 2/2001 | Smith et al. | |
| 6,654,741 B1 | 11/2003 | Cohen et al. | |
| 7,062,561 B1 | 6/2006 | Reisman | |
| 7,127,609 B2 | 10/2006 | Royer et al. | |
| 7,293,012 B1 | 11/2007 | Solaro et al. | |
| 7,516,094 B2 | 4/2009 | Perkowski | |
| 7,921,097 B1 | 4/2011 | Dandekar et al. | |
| 8,281,232 B2 * | 10/2012 | Vishria et al. | 715/208 |
| 8,381,276 B2 * | 2/2013 | Costinsky | 726/6 |
| 8,499,099 B1 * | 7/2013 | Kogan | 709/245 |
| 2002/0145992 A1 | 10/2002 | Holt | |
| 2003/0208584 A1 * | 11/2003 | Higgins | 709/223 |

OTHER PUBLICATIONS

Maitland, J., "Keeping Control Isn't Easy", Chapter 4: Cloud-Based Infrastructure, SearchCloudComputing.com, 13 pages.
Mell et al., "The NIST Definition of Cloud Computing", National Institute of Standards and Technology, Information Technology Laboratory, Version 15, Oct. 7, 2009, 2 pages.
"Flipboard", iTunes, 4 pages. No authors cited. Publication date not cited.
"PostPost Personalizes Social Search with New Timeline Topline", BusinessWire, Mar. 19, 2012, 2 pages. No authors cited.

* cited by examiner

*Primary Examiner* — Ruolei Zong
(74) *Attorney, Agent, or Firm* — William E. Schiesser; Keohane & D'Alessandro, PLLC

(57) ABSTRACT

Embodiments of the present invention provide an approach for aggregating Internet addresses (e.g., Uniform Resource Locators (URLs)) in a networked computing environment. In a typical embodiment, a set of URLs is received (e.g., by a system/engine). Upon receipt, a composite URL comprising at least portions of each received URL is generated and associated with a newly generated web page. The received set of URLs are displayed on the web page in a list, or the like, that may be sorted according to a set of criteria.

22 Claims, 5 Drawing Sheets

US 8,843,544 B2

AGGREGATING INTERNET ADDRESSES IN A NETWORKED COMPUTING ENVIRONMENT

TECHNICAL FIELD

Embodiments of present invention relate to Internet addresses. Specifically, embodiments of the present invention relate to the aggregation of Internet addresses (e.g., Uniform Resource Locators (URLs)) in a networked computing environment.

BACKGROUND OF THE INVENTION

Users interacting with Internet resources may specify addresses using a Uniform Resource Locator (URL). Typically, URLs specify a protocol (e.g., http, ftp, etc.) followed by a domain name (or IP address), along with the path of the resource to be accessed. Various automated URL shortening services exist to help redirect a user to a web page with a long URL (e.g., news web pages). For example, one approach provides a web service that may generate or provide short aliases/URLs for redirection of long URLs. The short URL may then be utilized to forward (or redirect) users to a web page associated with the long URL. Typically, automated URL shortening services exist to act upon a singular web page's address. As such, challenges may exist in providing an approach to shorten and/or abbreviate multiple URLs.

SUMMARY

Embodiments of the present invention provide an approach for aggregating Internet addresses (e.g., Uniform Resource Locators (URLs)) in a networked computing environment. In a typical embodiment, a set of URLs is received (e.g., by a system/engine). Upon receipt, a composite URL comprising at least portions of each received URL is generated and associated with a newly generated web page. The received set of URLs are displayed on the web page in a list, or the like, that may be sorted according to a set of criteria.

A first aspect of the present invention provides a computer-implemented method for aggregating web addresses in a networked computing environment, comprising: receiving a first web address in a computer memory medium from a requester; receiving a second web address in the computer memory medium from the requester; generating a composite web address comprising at least a portion of the first web address and the second web address; generating a web page comprising a list that includes the first web address and the second web address; and associate the composite web address with the web page in at least one computer storage device.

A second aspect of the present invention provides a system for aggregating web addresses in a networked computing environment, comprising: a bus; a processor coupled to the bus; and a memory medium coupled to the bus, the memory medium comprising instructions to: receive a first web address in a computer memory medium from a requester; receive a second web address in the computer memory medium from the requester; generate a composite web address comprising at least a portion of the first web address and the second web address; generate a web page comprising a list that includes the first web address and the second web address; and associate the composite web address with the web page in at least one computer storage device.

A third aspect of the present invention provides a computer program product for aggregating web addresses in a networked computing environment, the computer program product comprising a computer readable storage media, and program instructions stored on the a computer readable storage media, to: receive a first web address in a computer memory medium from a requester; receive a second web address in the computer memory medium from the requester; generate a composite web address comprising at least a portion of the first web address and the second web address; generate a web page comprising a list that includes the first web address and the second web address; and associate the composite web address with the web page in at least one computer storage device.

A fourth aspect of the present invention provides a method for deploying a system for aggregating web addresses in a networked computing environment: providing a computer infrastructure being operable to: receive a first web address in a computer memory medium from a requester; receive a second web address in the computer memory medium from the requester; generate a composite web address comprising at least a portion of the first web address and the second web address; generate a web page comprising a list that includes the first web address and the second web address; and associate the composite web address with the web page in at least one computer storage device.

BRIEF DESCRIPTION OF THE DRAWINGS

These and other features of this invention will be more readily understood from the following detailed description of the various aspects of the invention taken in conjunction with the accompanying drawings in which.

Figure 1:
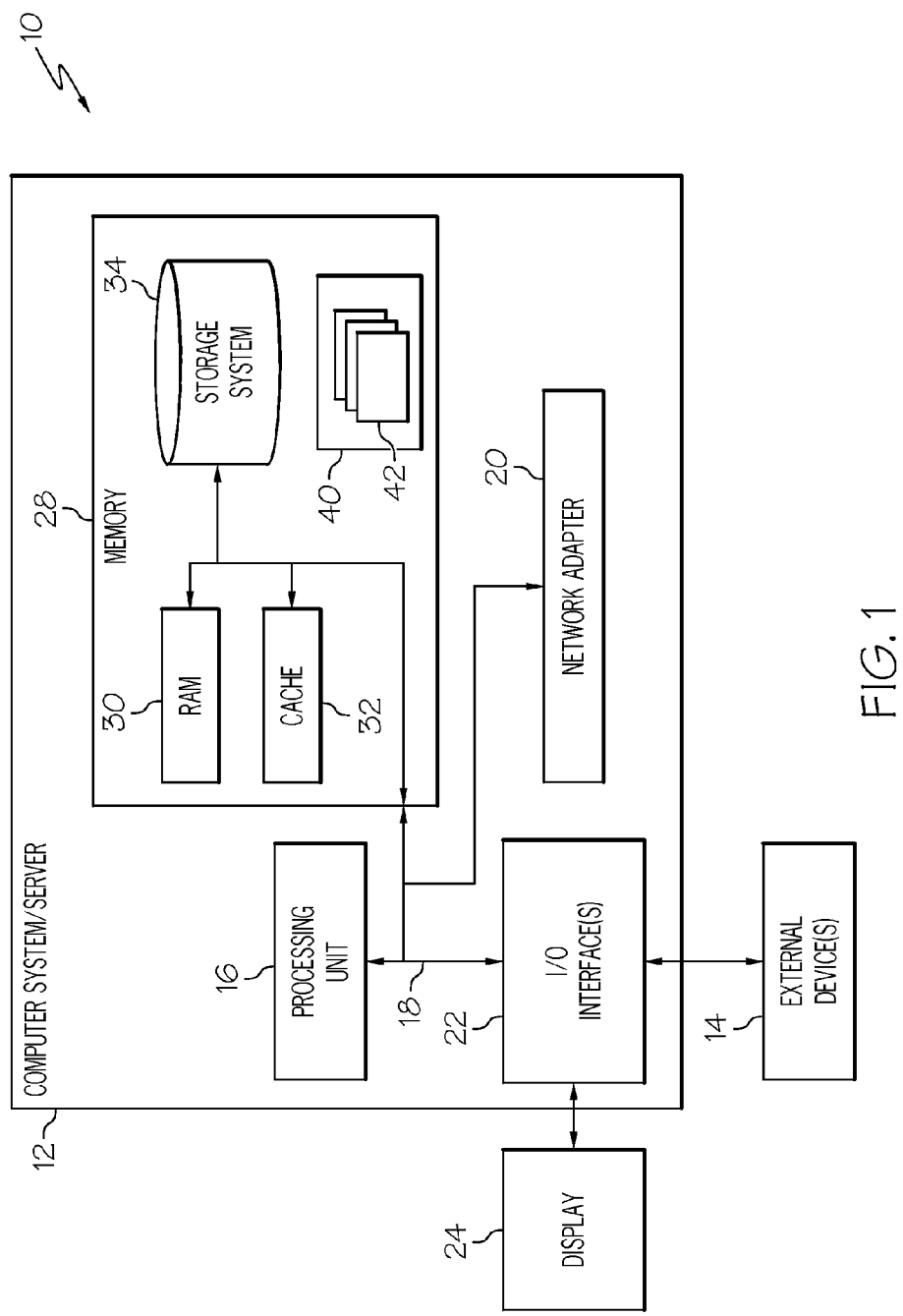
FIG. 1 depicts a computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The word "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for aggregating Internet addresses (e.g., Uniform Resource Locators (URLs)) in a networked computing environment. In a typical embodiment, a set of URLs is received (e.g., by a system/engine). Upon receipt, a composite URL comprising at least portions of each received URL is generated and associated with a newly generated web page. The received set of URLs are displayed on the web page in a list, or the like, that may be sorted according to a set of criteria. It is understood that although a typical embodiment of the present invention pertains to URLs, the teachings recited herein could be applied to any type of network address.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, mobile devices, global positioning systems (GPS), GPS-enable devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, which perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Web address (e.g., URL) aggregation program/utility 40, having a set (at least one) of program modules 42, may be stored in memory 28 by way of example, and not limitation, as well as an operating system, one or more application programs, other program modules, and program data. In general, web aggregation 40 performs the function of the present invention as described herein. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
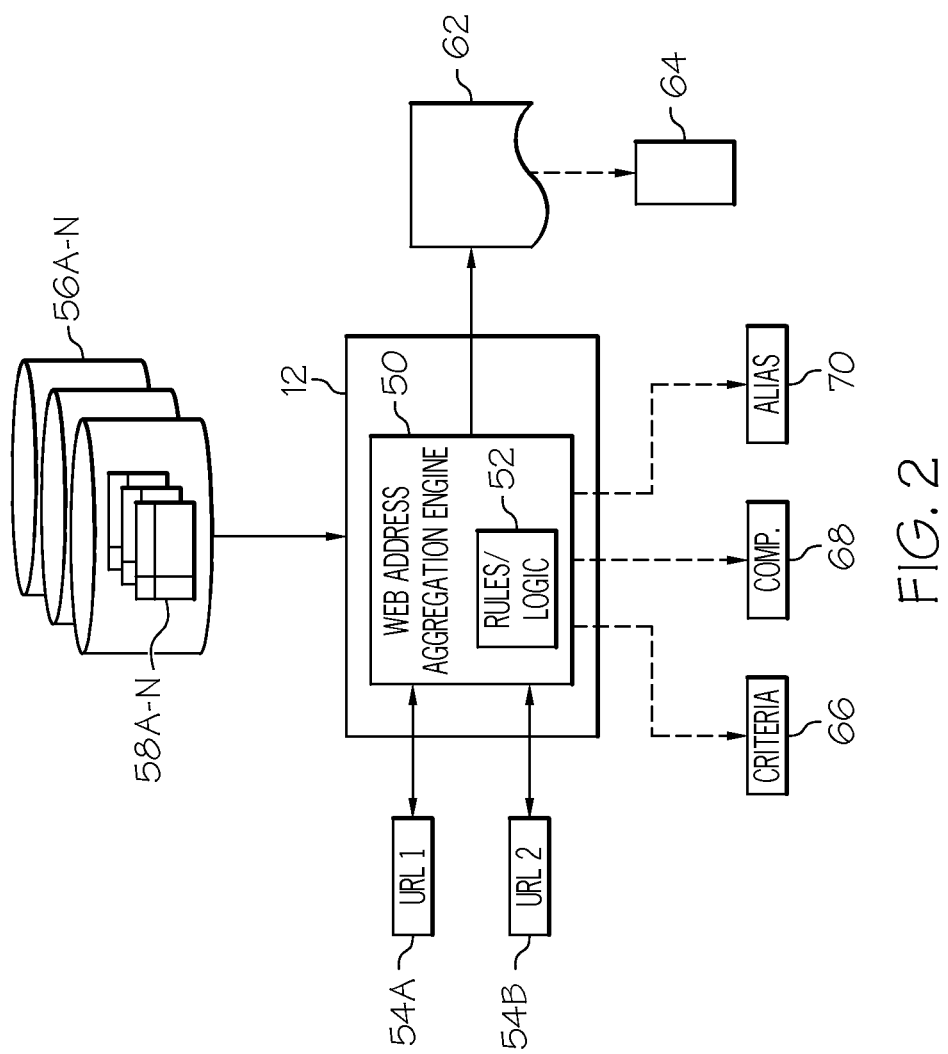
FIG. 2 depicts a system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment (e.g., a cloud computing environment). A computer system/server 12, which can be implemented as either a stand-alone computer system, or as a networked computer system is shown in FIG. 2 (e.g., via the Internet, a cloud computing environment, etc.). In the event the teachings recited herein are practiced in a networked computing environment, each client need not have a web address aggregation engine (engine 50). Rather, engine 50 could be loaded on a server (e.g., payment processing server) or server-capable device that communicates (e.g., wirelessly) with the clients to provide web address aggregation functionality hereunder. Regardless, as depicted, engine 50 is shown within computer system/server 12. In general, engine 50 can be implemented as program/utility 40 on computer system 12 of FIG. 1 and can enable the functions recited herein. As further shown, engine 50 (in one embodiment) comprises a rules and/or computational engine that processes a set (at least one) of rules/logic 52 and/or provides web address aggregation functionality hereunder.

Along these lines, engine 50 may perform multiple functions similar to a general-purpose computer. Specifically, among other functions, engine 50 may (among other things): receive a first uniform resource locator (URL) 54A in a computer memory medium (e.g., memory 28 of FIG. 1) from a requester; receive a second URL 54B in the computer memory medium from the requester; generate a composite URL 68 comprising at least a portion of the first URL 54A and the second URL 54B; generate a web page 62 comprising a list 64 that includes the first URL 54A and the second URL 54B; associate the composite URL 68 with the web page 62 in at least one computer storage device 56A-N (e.g., in one or more data structures 58A-N; sort the first URL 54A and the second URL 54B in the list 64 according to at least one criterion 66 (e.g., a date of modification of a corresponding web page, a relevance of the corresponding web page, a timeliness of the corresponding web page, a stated preference of the requester, and/or an implied preference of the requester); associate the first URL 54A with a first corresponding URL summary that describes the web page/site corresponding to the first URL 54A (e.g., in data structure(s) 58A-N); associate the second URL 54B with a second corresponding URL summary that describes the web page/site corresponding to the first URL 54B (e.g., in data structure(s) 58A-N; receive a manipulation of the list 64 (e.g., from a user such as the requester); sort the list 64 according to the manipulation; generate an alias URL 70 for the web page 62; associate the alias URL 70 with the composite URL 68 in the at least one computer storage device 56A-N (e.g., in data structure(s) 58A-N); and return the alias URL 70 to the requester.

Typical Embodiment

Shown below are illustrative steps according to a typical embodiment of the present invention:

1. A user/requester specifies two or more URLs.
2. The system converts the URL set to an html page with an ordered set of the selectable URLs.
3. The system returns a composite URL and an optional associated alias URL (e.g., shortened) for the page generated.
4. The composite URL may contain information that conveys:
   a. how many pages are in the composite;
   b. the various criteria used to sort the links in the composite; and/or
   c. the manner in which the link in the composite may be presented to the user.

Example Steps 4a-4c: Exemplary composite URL generated conveying to the receiver details within the composite URL:
Alias URL:
  http://XYZ.com/ppua
Proposed Composite URL:
  http://cmp.1_uspto.app.2_googlepatent.3_delphion/sort_order/present_all 5. The User may select and/or rearrange the composite URL with respect to Steps 4a-4c to change the manner in which the links in the composite are presented on the generated web page, Example Step 5: User drags/moves/re-types in different order within composite URL, which then reveals composite URL in different manner.

Figure 3:
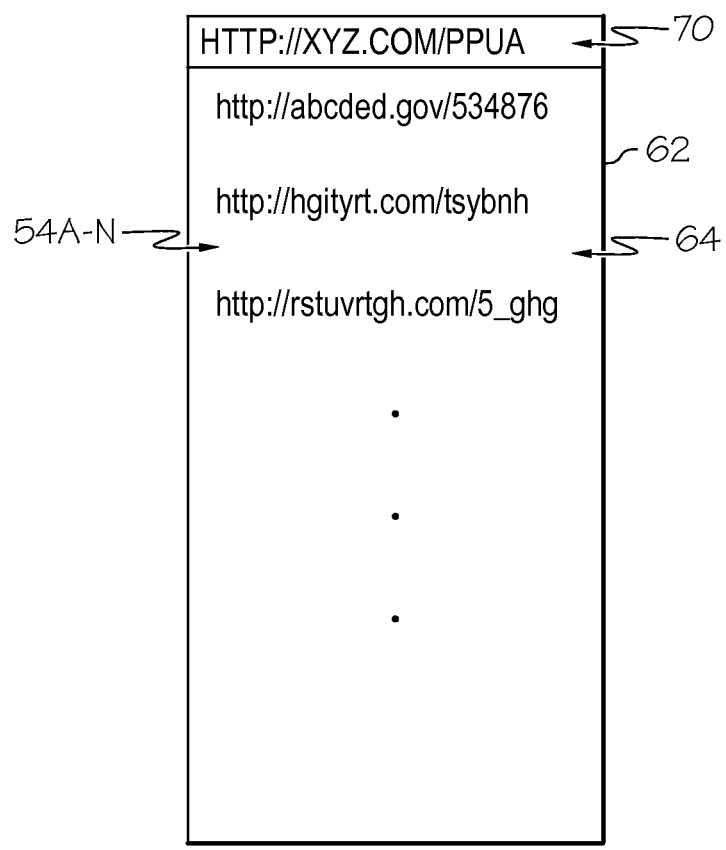
FIG. 3 depicts an illustrative web page according to an embodiment of the present invention.

Shown below are illustrative results from a user's/requester's manipulation/re-ordering of the composite URL:
User Manipulated Composite URL 1:
http://cmp.1_uspto.app.3_delphion/sort_accesstime/
present_all==>presents all links in composite URL sorted by the sender's access time.
User Manipulated Composite URL 2:
http://cmp.1_uspto.app.2_googlepatent.3_delphion/
filter_visited==>presents links in the composite URL that user has not visited already.
User Manipulated Composite URL 3:
http://cmp.1_uspto.app.2_googlepatent.3_delphion/
user_pref==>presents all composite URLs according to the receiver's preference Referring now to FIG. 3, a more detailed depiction of web page 62 is shown. As depicted, web page 62 may be associated with and display alias URL 70 (which itself is associated with the corresponding composite URL). web page 62 may comprise a list 64 of received/inputted URLs 54A-N. As indicated above, URLs 54A-N may be sorted in list 64 according to various criteria. Moreover, URLs 54A-N may be formatted (e.g., font size, font type, boldface, etc.) in list 64 according to various criteria/specifications. In any event, although not shown, URLs 54A-N may be accompanied by corresponding summaries of the corresponding web pages/websites. Moreover, URLs 54A-N may comprise active hyperlinks that direct a selecting user to the corresponding web page.

Illustrative Example

As an example, assume that a user wishes to convey a list of URLs for patent web pages, shopping sites, and/or or newspapers to colleagues.
URL Generation
For each set of URLs entered, the system adds a new alias in a hashed database and returns a short URL (e.g., such as http://composite-url.com/abc). If the URL has already been requested, the system may return the existing alias (e.g. http://composite-url.com/abc) rather than create a duplicate entry.

The specification of URLs may be manual or automatic (e.g. automatically generated from the last 5 URLs browsed by a user, automatically generated from two or more of the user's browser bookmarks, or automatically generated from two or more links provided in a social networking website, etc.). A user of the system may supply the composite URL generated to others so that others may see and use the ordered and selectable URL set in a convenient single URL. The user may also enter a short summary of the URL. If the user chooses not to enter a summary, one may be automatically generated from sources such as a search engine.

Ordering

The ordering of the URLs in the composite URL may be controlled by any of:

(1) a crowd-sourcing suggestion of ordering (e.g. popular voted-on sites listed first);
(2) date of modification or creation of initial URLs;
(3) relevance (e.g. as determined by an analysis of the document text associated with a URL);
(4) currently popular topics/timeliness (e.g. as determined by trending searches);
(5) stated user preferences (e.g., for given news sources, keywords, or subject matter); and/or
(6) implied user preferences (e.g., based on empirical experience wherein a user prioritizes certain news sources, keywords, or subject matter).

It may be noted that the user may be able to manually place items on the composite page (e.g., using AJAX or similar technologies, to achieve a preferential ordering or layout). In another embodiment, the URLs may be ordered based upon a relevance as determined by an analysis of document text associated with the URL. For example, a potential user may find it unwieldy to select a URL that is a composite of e.g., 50 URLs. However, this may become more convenient if the list is automatically sorted, as influenced by: (1) a user-profile of the receiver; and/or (2) a user-profile of the creator of the composite URL. For example, if the 50 links are to certain products, those links that have text dealing with "cameras" may be displayed first in the composite URL (e.g., or this ordering may refer to e-book pages, where the pages dealing with "U.S. history" appear before those dealing with "European history"). In another embodiment, an automated "rolling" composite URL may be provided (e.g., comprising a user's last five social networking posts that included links.

Rendering

Aside from URL ordering, URLs may be visually distinguished (e.g. by color, font, graphical decorations, etc.). Moreover, if a URL in the composite becomes unreachable, this may alter the ordering of URLs or depiction of URLs. Various schemas and templates may be used to alter the ordering and depiction of URLs. For example, an end-user may wish to see an ordering based on voting (or use) by one set of users, communities, or companies, whereas another end-user may wish to see an ordering based on voting (or use) by another set of users.

It is noted that embodiments of the present invention may be extended beyond web pages to pages in an e-book or the like. In this manner, links to one or more pages may automatically be aggregated as described above for URLs. Still yet, embodiments of the present invention may also be extended beyond web pages to pages on a mobile device. In this manner, links to pages that may not be able to be rendered on mobile devices may be re-ordered, not-shown, de-activated, etc., upon the detection of the system in which the composite URL service is being performed.

Figure 4:
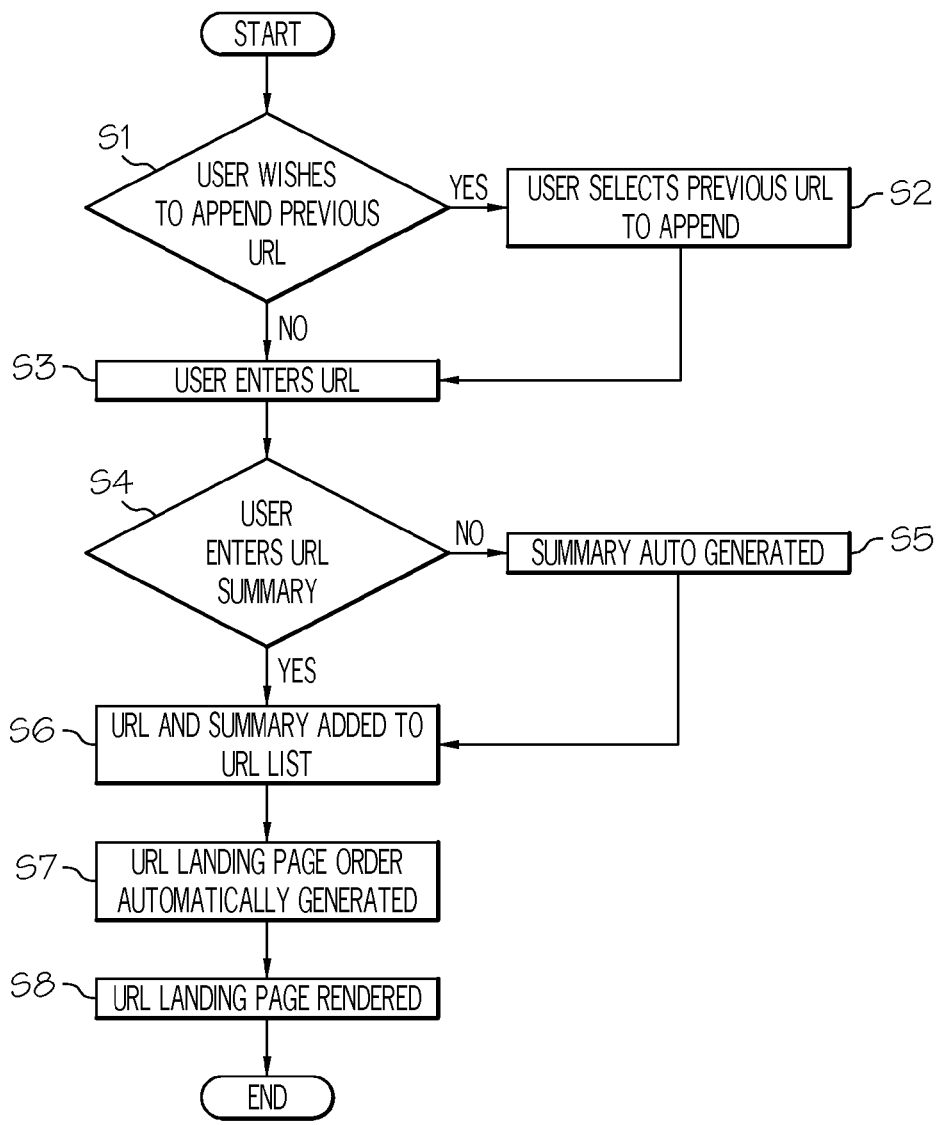
FIG. 4 depicts a method flow diagram according to an embodiment of the present invention.

Referring now to FIG. 4, a method flow diagram according to an embodiment of the present invention is shown. As depicted, in step S1, it is determined whether a user wishes to append a previously generated URL (e.g., from browsing history, from bookmarks, from a previous execution of the system hereunder, etc.) in creating a new composite URL. If so, the user may select such a URL in step S2. In either event, the user may enter a new URL in step S3. In step S4, it is determined whether the user has chosen to enter a corresponding summary for the new (and/or previous) URL. If so, the user may then enter a summary. If not, the summary may be automatically generated and associated with the URL(s) in step S5. In either event, the URL(s) and summary may be added to a URL list in step S6. In step S7, a URL landing page order may be automatically generated, and in step S8, a URL landing page may be rendered.

Figure 5:
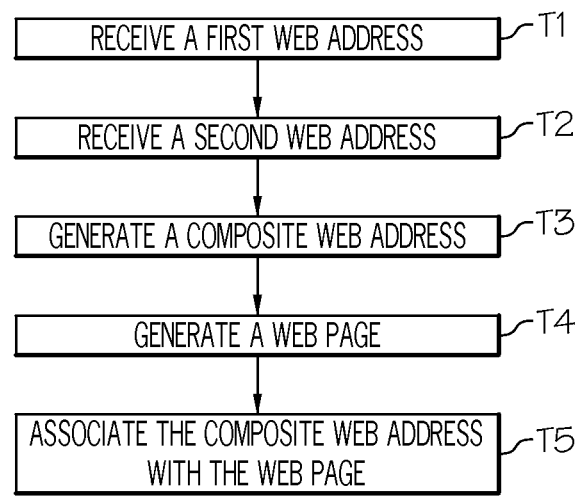
FIG. 5 depicts another method flow diagram according to an embodiment of the present invention.

Referring now to FIG. 5, a method flow diagram according to an embodiment of the present invention is shown (e.g., as enabled by engine 50 of FIG. 2). As depicted, in step T1, a first uniform resource locator (URL) is received in a computer memory medium from a requester. In step T2, a second URL is received in the computer memory medium from the requester. In step T3, a composite URL is generated comprising at least a portion of the first URL and the second URL. In step T4, a web page comprising a list is generated that includes the first URL and the second URL. In step T5, the composite URL is associated with the web page in at least one computer storage device.

While shown and described herein as a web address aggregation solution, it is understood that the invention further provides various alternative embodiments. For example, in one embodiment, the invention provides a computer-readable/useable medium that includes computer program code to enable a computer infrastructure to provide web address aggregation as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide web address aggregation functionality. In this case, the service provider can create, maintain, support, etc., a computer infrastructure, such as computer system 12 (FIG. 1) that performs the processes of the invention for one or more consumers. In return, the service provider can receive payment from the consumer (s) under a subscription and/or fee agreement and/or the service provider can receive payment from the sale of advertising content to one or more third parties.

In still another embodiment, the invention provides a computer-implemented method for web address aggregation. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for aggregating web addresses in a networked computing environment, comprising:
receiving a first web address corresponding to a first web site in a computer memory medium from a requester;
receiving a second web address corresponding to a second web site in the computer memory medium from the requester;
generating a composite web address comprising at least a portion of the first web address and the second web address;
generating a web page comprising a list that includes selectable links corresponding to the first web address and the second web address; and
associating the composite web address with the web page in at least one computer storage device.

2. The computer-implemented method of claim 1, further comprising sorting the first web address and the second web address in the list according to at least one criterion selected from a group consisting of: a date of modification of a corresponding web page, a relevance of the corresponding web page, a timeliness of the corresponding web page, a stated preference of the requester, and an implied preference of the requester.

3. The computer-implemented method of claim 1, further comprising:
receiving a manipulation of the list; and
sorting the list according to the manipulation.

4. The computer-implemented method of claim 1, wherein the first web address comprises a first Uniform Resource Locator (URL) and the second web address comprises a second URL.

5. The computer-implemented method of claim 1, further comprising:
generating an alias web address for the web page;
associating the alias web address with the composite web address in the at least one computer storage device; and
returning the alias web address to the requester.

6. The computer-implemented method of claim 1, further comprising:
associating the first web address with a first corresponding web address summary; and
associating the second web address with a second corresponding web address summary.

7. The computer-implemented method of claim 1, the composite web address further comprising at least one attribute of the web page selected from a group consisting of: a quantity of web pages referenced in the list, a format in which the first web address and the second web address are presented in the list, and at least one criterion in which the list is sorted.

8. A system for aggregating web addresses in a networked computing environment, comprising:
a bus;
a processor coupled to the bus; and
a memory medium coupled to the bus, the memory medium comprising instructions to:
receive a first web address corresponding to a first web site in a computer memory medium from a requester;
receive a second web address corresponding to a second web site in the computer memory medium from the requester;
generate a composite web address comprising at least a portion of the first web address and the second web address;
generate a web page comprising a list that includes selectable links corresponding to the first web address and the second web address; and
associate the composite web address with the web page in the at least one computer storage device.

9. The system of claim 8, the memory medium further comprising instructions to sort the first web address and the second web address in the list according to at least one criterion selected from a group consisting of: a date of modification of a corresponding web page, a relevance of the corresponding web page, a timeliness of the corresponding web page, a stated preference of the requester, and an implied preference of the requester.

10. The system of claim 8, the memory medium further comprising instructions to receive a manipulation of the list.

11. The system of claim 10, the memory medium further comprising instructions to sort the list according to the manipulation.

12. The system of claim 8, the memory medium further comprising instructions to:
generate an alias web address for the web page;
associate the alias web address with the composite web address in the at least one computer storage device; and
return the alias web address to the requester.

13. The system of claim 8, the memory medium further comprising instructions to:
   associate the first web address with a first corresponding web address summary; and
   associate the second web address with a second corresponding web address summary.

14. The system of claim 8, the composite web address further comprising at least one attribute of the web page selected from a group consisting of: a quantity of web pages referenced in the list, a format in which the first web address and the second web address are presented in the list, and at least one criterion in which the list is sorted.

15. A computer program product for aggregating web addresses in a networked computing environment, the computer program product comprising a computer readable storage device, and program instructions stored on the a computer readable storage device, to:
   receive a first web address corresponding to a first web site in a computer memory medium from a requester;
   receive a second web address corresponding to a second web site in the computer memory medium from the requester;
   generate a composite web address comprising at least a portion of the first web address and the second web address;
   generate a web page comprising a list that includes selectable links corresponding to the first web address and the second web address; and
   associate the composite web address with the web page in at least one computer storage device.

16. The computer program product of claim 15, the computer readable storage media further comprising instructions to sort the first web address and the second web address in the list according to at least one criterion selected from a group consisting of: a date of modification of a corresponding web page, a relevance of the corresponding web page, a timeliness of the corresponding web page, a stated preference of the requester, and an implied preference of the requester.

17. The computer program product of claim 15, the computer readable storage media further comprising instructions to receive a manipulation of the list.

18. The computer program product of claim 17, the at least one memory medium further comprising instructions to sort the list according to the manipulation.

19. The computer program product of claim 15, the computer readable storage media further comprising instructions to:
   generate an alias web address for the web page;
   associate the alias web address with the composite web address in the at least one computer storage device; and
   return the alias web address to the requester.

20. The computer program product of claim 15, the at least one memory medium further comprising instructions to:
   associate the first web address with a first corresponding web address summary; and
   associate the second web address with a second corresponding web address summary.

21. The computer program product of claim 15, the composite web address further comprising at least one attribute of the web page selected from a group consisting of: a quantity of web pages referenced in the list, a format in which the first web address and the second web address are presented in the list, and at least one criterion in which the list is sorted.

22. A method for deploying a system for aggregating web addresses in a networked computing environment:
   providing a computer infrastructure being operable to:
      receive a first web address corresponding to a first web site in a computer memory medium from a requester;
      receive a second web address corresponding to a second web site in the computer memory medium from the requester;
      generate a composite web address comprising at least a portion of the first web address and the second web address;
      generate a web page comprising a list that includes selectable links corresponding to the first web address and the second web address; and
      associate the composite web address with the web page in at least one computer storage device.

\* \* \* \* \*